(12) United States Patent
Lee et al.

(10) Patent No.: US 9,304,344 B2
(45) Date of Patent: Apr. 5, 2016

(54) DISPLAY DEVICE

(71) Applicant: LG Display Co., Ltd., Seoul (KR)

(72) Inventors: Deuk Woo Lee, Paju-si (KR); Hong Sung Song, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 25 days.

(21) Appl. No.: 14/051,125

(22) Filed: Oct. 10, 2013

(65) Prior Publication Data

US 2014/0176849 A1  Jun. 26, 2014

(30) Foreign Application Priority Data

Dec. 24, 2012  (KR) .................. 10-2012-0151988

(51) Int. Cl.
*G02F 1/1333* (2006.01)

(52) U.S. Cl.
CPC ............ *G02F 1/133308* (2013.01); *G02F 2001/133317* (2013.01); *G02F 2001/133322* (2013.01); *G02F 2201/46* (2013.01)

(58) Field of Classification Search
CPC ............. G02F 1/133308; G02F 2001/133317; G02F 2001/133322; G02F 2202/28; G02F 2201/46
USPC ........................................................... 349/58
See application file for complete search history.

(56) References Cited

U.S. PATENT DOCUMENTS

| 2003/0227581 | A1 | 12/2003 | Sung et al. | |
|---|---|---|---|---|
| 2004/0041961 | A1 | 3/2004 | Lee | |
| 2008/0101001 | A1 | 5/2008 | Shin et al. | |
| 2012/0262855 | A1* | 10/2012 | Park et al. | 361/679.01 |
| 2012/0262907 | A1* | 10/2012 | Lee et al. | 362/97.1 |

FOREIGN PATENT DOCUMENTS

| CN | 1467542 A | 1/2004 |
|---|---|---|
| CN | 1487337 A | 4/2004 |
| CN | 101726902 A | 6/2010 |
| CN | 102750879 A | 10/2012 |
| TW | 201137444 A | 11/2011 |

* cited by examiner

*Primary Examiner* — Nathanael R Briggs
*Assistant Examiner* — William Peterson
(74) *Attorney, Agent, or Firm* — Dentons US LLP

(57) ABSTRACT

Disclosed is a display device that includes a display panel, a guide frame configured to support the display panel, a plurality of fixers arranged between the display panel and the guide frame and include an accommodating part, a cover member inserted into the accommodating part of each fixer and configured to fix the display panel to the guide frame together with the plurality of fixers, and a pad disposed between the display panel and the guide frame and configured to prevent penetration of a foreign material.

19 Claims, 3 Drawing Sheets

DISPLAY DEVICE

CROSS-REFERENCE TO RELATED APPLICATIONS

This application claims the benefit of the Korean Patent Application No. 10-2012-0151988 filed on Dec. 24, 2012, which is hereby incorporated by reference for all purposes as if fully set forth herein.

BACKGROUND OF THE INVENTION

1. Field of the Invention

The present invention relates to a display device, and more particularly, to a display device with an enhanced aesthetic appearance.

2. Discussion of the Related Art

Liquid crystal display (LCD) devices, plasma display panels (PDPs), organic light emitting display devices, etc. were developed as flat panel display devices that eventually replaced cathode ray tubes (CRTs) which were the initial display devices.

In such flat panel display devices, a large-sized screen has been realized by reducing weight and volume, and quality has increased by continuously researching and developing response time, image quality, etc.

Recently, in terms of technology and design more appealing to consumers, research and development of flat panel display devices are increasingly required. Therefore, the demand for an enhanced aesthetic design, which can induce consumers to buy by appealing to the consumers' sense of beauty, is progressively increasing.

However, due to structural characteristics, the related art display devices have a limitation in enhancing an aesthetic appearance. Hereinafter, limitations of the related art display devices will be described in more detail with reference to FIG. 1.

FIG. 1 is a schematic sectional view illustrating a related art display device.

As illustrated in FIG. 1, the related art display device includes a display panel 10, a backlight unit 20, a lower case 30, and an upper case 40.

A liquid crystal panel is illustrated as an example of the display panel 10, and includes an upper substrate 11, a lower substrate 12, an upper polarizer 13, and a lower polarizer 14.

The backlight unit 20 is disposed under the display panel 10, and supplies light to the display panel 10.

The lower case 30 and the upper case 40 accommodate the display panel 10 and the backlight unit 20, and act as an outer case of the display device.

However, since the lower case 30 and the upper case 40 are necessarily used, the related art display device has a limitation in changing a design.

Especially, since the upper case 40 covers a top edge of the display panel 10, a bezel width of the display device increases, causing a degradation of an aesthetic appearance. Also, a step height is formed between the upper case 40 and the display panel 10, and hinders realization of various aesthetic designs.

SUMMARY

Accordingly, the present invention is directed to provide a display device that substantially obviates one or more problems due to limitations and disadvantages of the related art.

An aspect of the present invention is to provide a display device that has an aesthetic appearance enhanced by removing an upper case.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a display panel; a guide frame configured to support the display panel; a plurality of fixers arranged between the display panel and the guide frame, each of the plurality of fixers including an accommodating part; a cover member inserted into the accommodating part of each fixer, and configured to fix the display panel to the guide frame together with the plurality of fixers, the cover member acting as an outer cover; and a pad disposed between the display panel and the guide frame, and configured to prevent penetration of a foreign material.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE ILLUSTRATED EMBODIMENTS

Reference will now be made in detail to the exemplary embodiments of the present invention, examples of which are illustrated in the accompanying drawings. Wherever possible, the same reference numbers will be used throughout the drawings to refer to the same or like parts.

Figure 1:
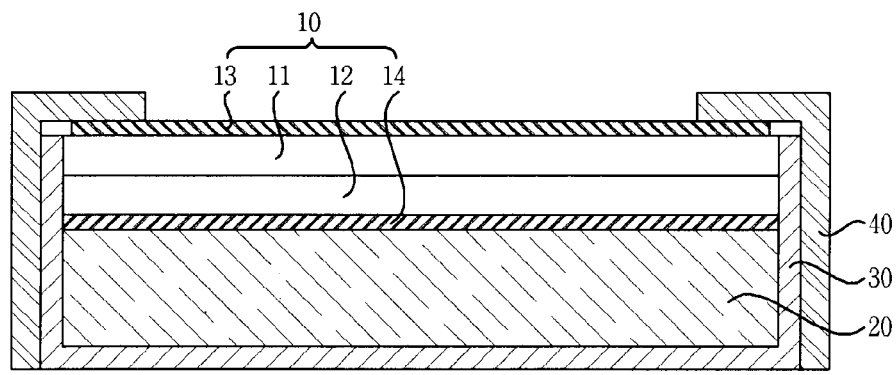
FIG. 1 is a schematic sectional view illustrating a related art display device.
Figure 2:
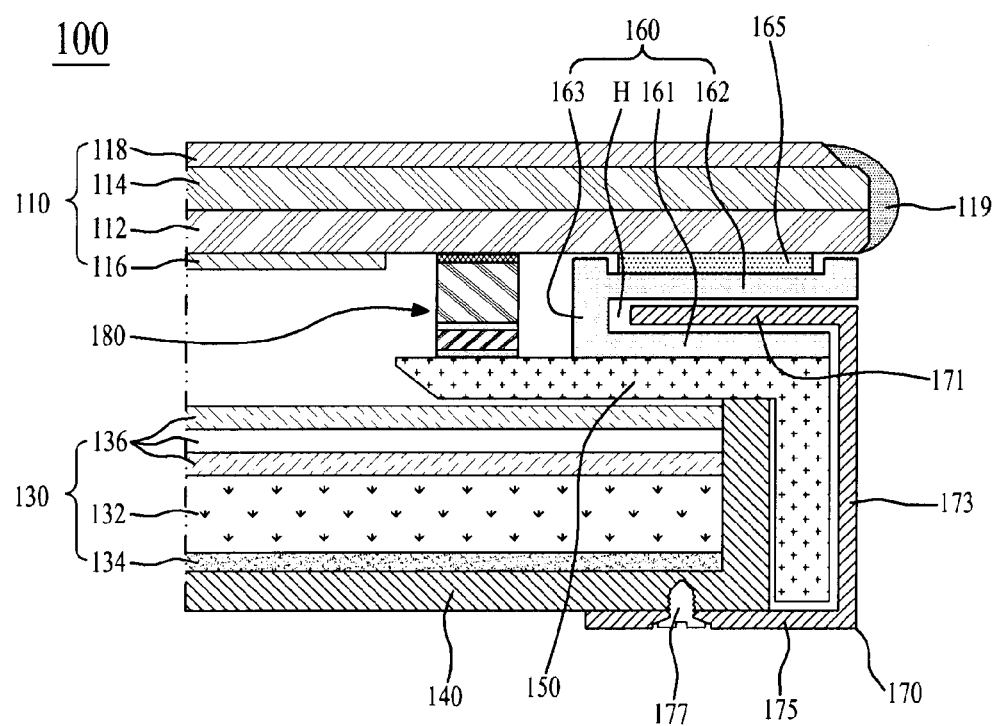
FIG. 2 is a schematic sectional view illustrating a display device according to an embodiment of the present invention.

FIG. 2 is a schematic sectional view illustrating a display device according to an embodiment of the present invention.

As illustrated in FIG. 2, the display device according to an embodiment of the present invention includes a display panel 110, a backlight unit 130, a support case 140, a guide frame 150, a fixer 160, a cover member 170, and a pad 180.

In FIG. 2, a liquid crystal panel is illustrated as an example of the display panel 110. However, the display panel 110 according to the present invention may be various panels, known to those skilled in the art, such as an organic light emitting panel, a plasma display panel, etc., other than the liquid crystal panel.

The liquid crystal panel is a non-emitting panel, and thus needs the backlight unit 130 as a light source. However, the organic light emitting panel and the plasma display panel are self-emitting panels, and thus do not need the backlight unit 130.

The display panel 110 includes a lower substrate 112, an upper substrate 114, a lower polarizer 116, an upper polarizer 118, and a side sealant 119. Although not shown, a liquid crystal layer is formed between the lower substrate 112 and the upper substrate 114.

A plurality of gate lines and a plurality of data lines, which cross each other to define a plurality of pixel areas, may be formed on the lower substrate 112. A thin film transistor (TFT) may be formed as a switching element in each of the pixel areas defined by the crossings of the gate lines and data lines, and a pixel electrode connected to the TFT may be formed in each pixel area.

A plurality of black matrixes for preventing light from being leaked to an area other than the pixel areas may be formed on the upper substrate 114, and a color filter may be formed in an area between adjacent black matrixes. An overcoat layer may be formed on a color filter layer including a plurality of the color filters.

A detailed configuration of each of the lower substrate 112 and upper substrate 114 may be changed to various types known to those in the art, according to a driving mode of the liquid crystal panel, for example, a twisted nematic (TN) mode, a vertical alignment (VA) mode, an in-plane switching (IPS) mode, a fringe field switching (FFS) mode, etc.

The lower polarizer 116 is adhered to a bottom of the lower substrate 112, and the upper polarizer 118 is adhered to a top of the upper substrate 114. A light transmittance is adjusted by a combination of the lower polarizer 116 and upper polarizer 118, thereby realizing a black or white image. Although not shown, a retarder film applied for converting a two-dimensional (2D) image into a three-dimensional (3D) image may be additionally adhered to a top of the upper polarizer 118.

The side sealant 119 seals a side surface of each of the lower substrate 112 and upper substrate 114. The side sealant 119 may be formed of a heat hardening resin or an ultraviolet (UV) hardening resin. The side sealant 119 may contain a light blocking material such as carbon black, for preventing a leakage of light.

The side sealant 119 may be disposed at all of four side surfaces of each of the lower substrate 112 and upper substrate 114, but is not limited thereto. For example, a panel driver for applying a gate signal or data signals may be adhered to one side of the lower substrate 112. The side sealant 119 may not be provided at the side surface to which the panel driver is adhered.

The backlight unit 130 is disposed under the display panel 110, and supplies light to the display panel 110. The backlight unit 130 is placed in the support case 140.

The backlight unit 130 may be categorized into a direct type, in which a light source is disposed at an entire lower surface of the display panel 110 and light emitted from the light source is transferred to the display panel 110, and an edge type in which a light source is disposed at one side of a lower portion of the display panel 110 and light emitted from the light source is transferred to the display panel 110 through a light guide plate. The direct type or the edge type may be all applied to the present invention. That is, an edge type backlight unit 130 is illustrated in the drawing, but is not limited thereto.

The backlight unit 130 includes a light source (not shown), a light guide plate 132, a reflector 134, and an optical sheet 136.

The light source is disposed to face a side surface of the light guide plate 132, and light emitted from the light source is incident on the light guide plate 132 and then a path of the light is changed toward the display panel 110. The light source may use a light emitting diode (LED) or a fluorescent lamp.

The light guide plate 132 changes a path of light, emitted from the light source, toward the display panel 110. In order to change the light path, although not shown, various types of intaglio patterns or embossed patterns are formed in the light guide plate 132.

The reflector 134 is disposed under the light guide plate 132, and reflects light, leaked to under the light guide plate 132, to an upper portion, thereby increasing a light efficiency.

The optical sheet 136 is disposed above the light guide plate 132, and uniformly supplies light to the display panel 110. The optical sheet 136 may be configured by a combination of a diffusive sheet and a prism sheet.

The support case 140 guides a position of the backlight unit 130, and supports the backlight unit 130. Specifically, the support case 140 supports a bottom of the backlight unit 130, and surrounds a side surface of the backlight unit 130. Also, the support case 140 contacts a bottom of the guide frame 150, and supports the guide frame 150.

The support case 140 may uniformly transfer and dissipate heat emitted from the backlight unit 130. That is, since heat is emitted from the backlight unit 130, a heat dissipating instrument for dissipating heat emitted from the backlight unit 130 is needed. Therefore, when the support case 140 is formed of a material such as metal enabling conduction of heat, heat emitted from the backlight unit 130 may be dissipated to the outside through the support case 140.

The guide frame 150 supports the display panel 110. Specifically, the guide frame 150 supports a bottom edge of the display panel 110, and particularly, supports the fixer 160 coupled to the bottom edge of the display panel 110. Also, the guide frame 150 is bent to surround a side surface of the backlight unit 130, especially, a side surface of the support case 140.

Although not shown, the support case 140 and the guide frame 150 may be coupled to each other with a double-sided adhesive, coupled to each other by a hook coupling using a groove and a protrusion element, or coupled to each other with a bolt and a nut depending on a case.

A combination of the fixer 160 and cover member 170 fixes the display panel 110 to the guide frame 150.

When a mechanical impact is applied to the display panel 110, the fixer 160 buffers the impact, and fixes the display panel 110 to the guide frame 150.

The fixer 160 includes a disposing part 161, a supporting part 162, and a connecting part 163. The disposing part 161 is disposed on the guide frame 150, and supported by the guide frame 150. The supporting part 162 supports a bottom of the display panel 110. The connecting part 163 connects one end of the disposing part 161 and one end of the supporting part 162. An accommodating part H is prepared by the disposing part 161, the supporting part 162, and the connecting part 163, and the cover member 170 is inserted into the accommodating part H.

The fixer 160 is coupled to the display panel 110, but is not coupled to the guide frame 150. That is, a coupling member 165 is not disposed between the disposing part 161 and the guide frame 150, but is disposed between the supporting part 162 and the display panel 110.

The coupling member 165 couples a bottom edge of the lower substrate 112 and a top of the supporting part 162. The lower polarizer 116 is not disposed at the bottom edge of the lower substrate 112 which the coupling member 165 contacts the bottom edge of the lower substrate 112.

The coupling member 165 may be, for example, double-sided tape, but is not limited thereto. As another example, the coupling member 165 may be formed of various adhesive materials known to those skilled in the art.

The cover member 170 fixes the display panel 110 to the guide frame 150 together with the fixer 160, and acts as an outer cover of a display device such as a notebook computer or a television (TV). Particularly, the cover member 170 acts as a bottom and side cover of the display device.

To this end, the cover member 170 includes an inserting part 171, a side cover 173, and a rear cover 175.

The inserting part 171 is inserted into the accommodating part H included in the fixer 160. At this time, despite the inserting part 171 being inserted into the accommodating part H, a free space is provided in the accommodating part H, a buffering effect can be obtained by the free space when an external impact is applied to the display device, thus buffering the impact applied to the display panel 110. In other words, a volume of the inserting part 171 inserted into the accommodating part H is less than that of the accommodating part H.

The side cover 173 is bent at and extended from one end of the inserting part 171 to surround a side surface of the guide frame 150.

The rear cover 175 is bent at and extended from one end of the side cover 173 to surround a rear surface of the support case 140. The rear cover 175 is coupled to the support case 140 with a coupling element 177 such as a bolt and a nut.

Since the fixer 160 and the cover member 170 are disposed under the display panel 110, a border is removed from the display device, and only the display panel 100 is disposed at a front surface of the display device, thus enhancing an aesthetic appearance of the display device.

The pad 180 prevents foreign material from penetrating into the display device, and can also perform a function of preventing a leakage of light.

The pad 180 is disposed between the display panel 110 and the guide frame 150, in particular, the lower substrate 112 and the guide frame 150. Also, the pad 180 is disposed near a distal end of the guide frame 150, and thus disposed more inward than the fixer 160. A detailed disposition of the fixer 160 and pad 180 can be more easily understood with reference FIG. 3.

Figure 3:
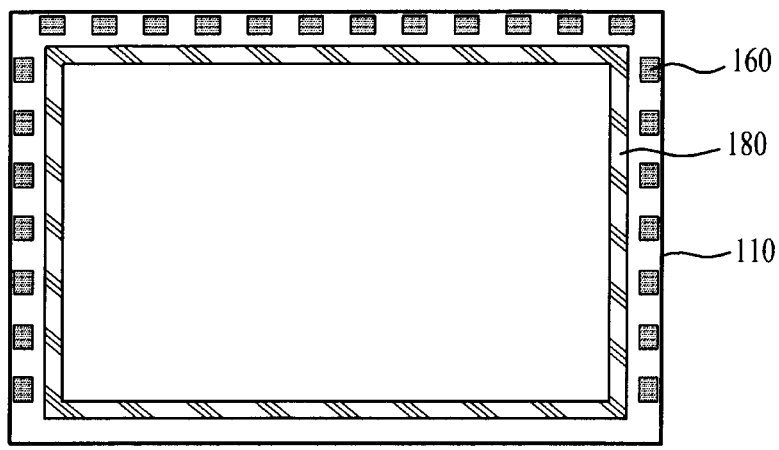
FIG. 3 is a schematic plan view illustrating a display device according to an embodiment of the present invention.

FIG. 3 is a schematic plan view illustrating a display device according to an embodiment of the present invention, and illustrates a disposition structure of the fixer 160 and pad 180.

As seen in FIG. 3, a plurality of the fixers 160 are arranged at certain intervals at an edge of the display panel 110. For this reason, a foreign material can penetrate into the display panel 110 through respective areas between the plurality of fixers 160, and light can be leaked through the respective areas between the plurality of fixers 160.

Therefore, the pad 180 is disposed more inward than the plurality of fixers 160, for preventing a penetration of a foreign material and a leakage of light. That is, the pad 180 is disposed more closely to a center of the display panel 110 than the plurality of fixers 160.

The pad 180 is disposed in an area facing the plurality of fixers 160 and an area facing the respective areas between the plurality of fixers 160. Particularly, the pad 180 is formed in a linear structure continued along an edge of the display panel 110.

In FIG. 3, the plurality of fixers 160 and the pad 180 are illustrated as being disposed at all of four side surfaces of the display panel 110, but are not limited thereto. For example, a panel driver for applying a gate signal or data signals may be adhered to one side surface of the display panel 110. The fixer 160 and the pad 180 may not be provided at a side surface of the display panel 110 to which the panel driver is adhered.

Figure 4:
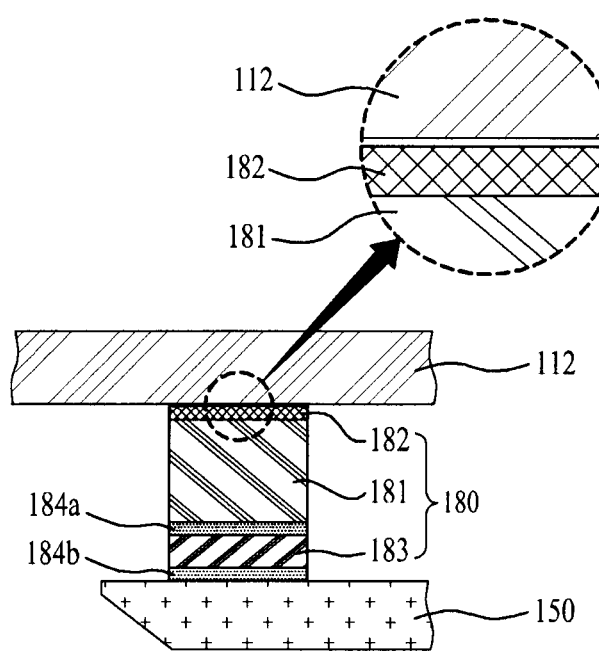
FIG. 4 is a sectional view illustrating a pad disposed between a lower substrate and a guide frame according to an embodiment of the present invention.

FIG. 4 is a sectional view illustrating the pad disposed between the lower substrate and the guide frame according to an embodiment of the present invention.

As seen in FIG. 4, the pad 180 is disposed between the lower substrate 112 and the guide frame 150.

The pad 180 includes a cushion layer 181, a surface protecting layer 182, a light blocking layer 183, and a plurality of adhesive layers 184a and 184b.

The cushion layer 181 may be formed of an elastic material such as foam polyurethane, and can absorb an impact applied to the display panel 110.

The surface protecting layer 182 is formed at a top surface of the cushion layer 181, and protects the top of the cushion layer 181. That is, when the cushion layer 181 directly contacts the lower substrate 112, a surface of the cushion layer 181 can be damaged, in which case the pad 180 can be weakened in the function of preventing a penetration of a foreign material and a function of preventing a leakage of light. For this reason, the surface protecting layer 182 is formed at a top surface of the cushion layer 181, and prevents surface damage to the cushion layer 181. The surface protecting layer 182 may be formed of, for example, polyethylene terephthalate (PET), polyurethane, or the like, but is not limited thereto.

The light blocking layer 183 is formed at a bottom of the cushion layer 181. The pad 180 has the function of preventing light leakage by the light blocking layer 183. The light blocking layer 183 may be formed of a black pigment-containing resin, for example, PET containing carbon black, but is not limited thereto.

The adhesive layers 184a and 184b include a first adhesive layer 184a for adhering the light blocking layer 183 to the cushion layer 181 and a second adhesive layer 184b for adhering the light blocking layer 183 to the guide frame 150.

That is, the first adhesive layer 184a is formed between the light blocking layer 183 and the cushion layer 181, and the second adhesive layer 184b is formed between the light blocking layer 183 and the guide frame 150.

The adhesive layers 184a and 184b may use various adhesives known to those skilled in the art, and preferably may use an adhesive having a light blocking effect.

The above-described pad 180 is coupled to the guide frame 150, but is not coupled to the lower substrate 112. That is, the pad 180 and the guide frame 150 are coupled to each other by the second adhesive layer 184b. However, an adhesive is not formed between the surface protecting layer 182 and the lower substrate 112, and thus, as seen in an enlarged view, a fine gap may be formed between the surface protecting layer 182 and the lower substrate 112.

Like this, the pad 180 is coupled to the guide frame 150 without being coupled to the lower substrate 112, and thus can buffer an impact applied to the display panel 110.

Although not shown, the pad 180 may be coupled to the lower substrate 112 without being coupled to the guide frame 150. In this case, in FIG. 4, the surface protecting layer 182 and the second adhesive layer 184b may be changed in disposed position. That is, the surface protecting layer 182 may be formed at a bottom of the light blocking layer 183 to face the guide frame 150, and the second adhesive layer 184b may be formed at a top of the cushion layer 181 so as to be adhered to the lower substrate 112.

Figure 5:
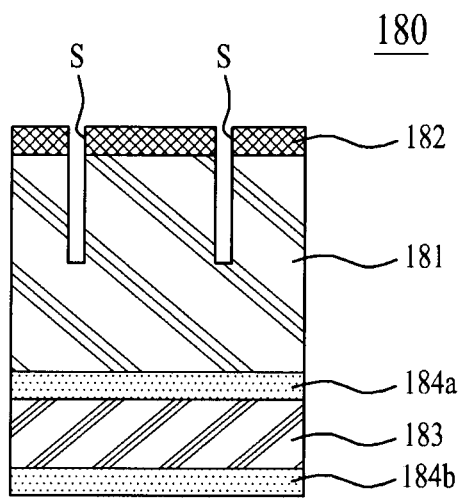
FIG. 5 is a sectional view illustrating a pad according to another embodiment of the present invention.

FIG. 5 is a sectional view illustrating a pad according to another embodiment of the present invention.

Except that a slit S is additionally formed in the pad of FIG. 4, the pad according to another embodiment of the present invention illustrated in FIG. 5 is the same as the pad of FIG. 4. Accordingly, like reference numerals refer to like elements, and the following description will be made on only different elements.

As seen in FIG. 5, according to another embodiment of the present invention, at least one slit S is formed in the surface protecting layer 182 and the cushion layer 181.

Like this, since the slit S is formed in the cushion layer 181, when an impact is applied to the display panel 110, the cushion layer 181 can more easily absorb the impact.

Number, depth, position, etc. of the slit S may be appropriately changed in consideration of an impact absorbing effect within a limit in which a function of the pad 180 is not weakened.

In the display device according to the present invention, since the display panel is fixed to the guide frame by a combination of the fixer and cover member disposed under the display panel, a border is removed from the display device, and only the display panel is disposed at the front surface of the display device, thus enhancing an aesthetic appearance of the display device.

Moreover, according to the present invention, the pad is disposed between the display panel and the guide frame, and can prevent a foreign material from penetrating into the display device.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
a display panel;
a guide frame configured to support the display panel;
a plurality of fixers arranged between the display panel and the guide frame, each of the plurality of fixers comprising an accommodating part;
a cover member inserted into the accommodating part of each fixer, and configured to fix the display panel to the guide frame together with the plurality of fixers, the cover member acting as an outer cover; and
a pad disposed between the display panel and the guide frame, and configured to prevent penetration of a foreign material,
wherein the pad is disposed between a center of the display panel and the plurality of fixers, and
wherein the pad comprises:
a cushion layer;
a light blocking layer under the cushion layer; and
a surface protecting layer disposed at a top surface of the cushion layer or at a bottom of the light blocking layer.

2. The display device of claim 1, wherein, the plurality of fixers are arranged at certain intervals at an edge of the display panel, and the pad is disposed in an area facing the plurality of fixers and an area facing respective areas between the plurality of fixers.

3. The display device of claim 1, wherein the pad is disposed more closely to a center of the display panel than the plurality of fixers.

4. The display device of claim 1, wherein the pad is attached to one of the display panel and the guide frame, and is not attached to the other.

5. The display device of claim 1, wherein a slit is formed in the cushion layer.

6. The display device of claim 1, wherein,
the fixer comprises:
a disposing part disposed in the guide frame;
a supporting part configured to support a bottom of the display panel; and
a connecting part configured to connect the disposing part and the supporting part, and
the accommodating part is prepared by the disposing part, the supporting part, and the connecting part.

7. The display device of claim 1, wherein the fixers are attached to the display panel, and are not attached to the guide frame.

8. The display device of claim 1, wherein,
the cover member comprises:
an inserting part inserted into the accommodating part;
a side cover bent at and extended from the inserting part; and
a rear cover bent at and extended from the side cover, and
a free space is formed in the accommodating part with the inserting part inserted thereinto.

9. The display device of claim 1, further comprising:
a support case configured to support the guide frame; and
a backlight unit disposed in the support case.

10. The display device of claim 1, wherein the pad has a linear structure continued along an edge of the display panel.

11. A display device comprising:
a display panel;
a guide frame configured to support the display panel;
a plurality of fixers arranged between the display panel and the guide frame, each of the plurality of fixers comprising an accommodating part;
a cover member inserted into the accommodating part of each fixer, and configured to fix the display panel to the guide frame together with the plurality of fixers, the cover member acting as an outer cover; and
a pad disposed between the display panel and the guide frame, and configured to prevent penetration of a foreign material,
wherein the pad comprises:
a cushion layer;
a light blocking layer formed under the cushion layer; and
a surface protecting layer formed at a top surface of the cushion layer or at a bottom of the light blocking layer.

12. The display device of claim 11, wherein, the plurality of fixers are arranged at certain intervals at an edge of the display panel, and
the pad is disposed in an area facing the plurality of fixers and an area facing respective areas between the plurality of fixers.

13. The display device of claim 11, wherein the pad is disposed more closely to a center of the display panel than the plurality of fixers.

14. The display device of claim 11, wherein the pad is attached to one of the display panel and the guide frame, and is not attached to the other.

15. The display device of claim 11, wherein a slit is formed in the cushion layer.

16. The display device of claim 11, wherein, the fixer comprises:
- a disposing part disposed in the guide frame;
- a supporting part configured to support a bottom of the display panel; and
- a connecting part configured to connect the disposing part and the supporting part, and
- the accommodating part is prepared by the disposing part, the supporting part, and the connecting part.

17. The display device of claim 11, wherein the fixers are attached to the display panel, and are not attached to the guide frame.

18. The display device of claim 11, wherein, the cover member comprises:
- an inserting part inserted into the accommodating part;
- a side cover bent at and extended from the inserting part; and
- a rear cover bent at and extended from the side cover, and
- a free space is formed in the accommodating part with the inserting part inserted thereinto.

19. The display device of claim 11, further comprising:
- a support case configured to support the guide frame; and
- a backlight unit disposed in the support case.

* * * * *